United States Patent
Weyerhaeuser et al.

(10) Patent No.: US 9,305,065 B2
(45) Date of Patent: Apr. 5, 2016

(54) CALCULATING COUNT DISTINCT USING VERTICAL UNIONS

(75) Inventors: Christoph Weyerhaeuser, Heidelberg (DE); Tobias Mindnich, Walldorf (DE); Daniel Baeumges, Viersen (DE); Gerrit Simon Kazmaier, Heidelberg (DE)

(73) Assignee: SAP SE, Walldorf (DE)

( * ) Notice: Subject to any disclaimer, the term of this patent is extended or adjusted under 35 U.S.C. 154(b) by 445 days.

(21) Appl. No.: 13/457,361

(22) Filed: Apr. 26, 2012

(65) Prior Publication Data

US 2013/0290293 A1    Oct. 31, 2013

(51) Int. Cl.
*G06F 17/30* (2006.01)

(52) U.S. Cl.
CPC ................ *G06F 17/30539* (2013.01)

(58) Field of Classification Search
None
See application file for complete search history.

(56) References Cited

U.S. PATENT DOCUMENTS

| | | | |
|---|---|---|---|
| 6,484,162 B1 | 11/2002 | Edlund et al. | |
| 6,618,719 B1 | 9/2003 | Andrei | |
| 2005/0177553 A1* | 8/2005 | Berger et al. | 707/3 |
| 2006/0212418 A1 | 9/2006 | Dettinger et al. | |
| 2007/0106643 A1* | 5/2007 | Croft et al. | 707/3 |
| 2010/0306188 A1 | 12/2010 | Cunningham et al. | |
| 2012/0005190 A1* | 1/2012 | Faerber et al. | 707/718 |

OTHER PUBLICATIONS

Bizarro, Pedro et al., "Progressive Parametric Query Optimization", IEEE Transactions on Knowledge and Data Engineering, vol. 21, No. 4, Apr. 1, 2009.

Martinez-Medina, Lurdes Angelica et al., "Query optimization using case-based reasoning in ubiquitous environments", 2009 Mexican International Conference on Computer Science (ENC), Sep. 21, 2009.

European Search Report and Written Opinion dated Mar. 5, 2012, issued by the European Patent Office in connection with corresponding EP Application No. 11004965.7.

* cited by examiner

*Primary Examiner* — Miranda Huang
(74) *Attorney, Agent, or Firm* — Mintz Levin Cohn Ferris Glovsky and Popeo, P.C.

(57) ABSTRACT

A query statement is received that specifies a count distinct. Thereafter, a data flow graph that comprises a plurality of nodes for executing the query is generated. The nodes provide aggregation operations, sorting of results on join attributes and vertically appending columns of count distinct results with intermediate results from at least one of the aggregation operations. Thereafter, execution of the query is initiated using the data flow graph. Related apparatus, systems, techniques and articles are also described.

13 Claims, 9 Drawing Sheets

900

Vertical Union Explanation

CALCULATING COUNT DISTINCT USING VERTICAL UNIONS

TECHNICAL FIELD

The subject matter described herein relates to count distinct operations using vertical unions.

BACKGROUND

Advanced databases are providing functionality similar to conventional business warehouse architectures by handling more complex calculations. For example, databases can calculate the count distinct of attributes such as count distinct on customers for each region. In order to calculate such a query, different aggregation levels and intermediate results must be combined. Such operations are typically done by using a join operation that can unnecessarily consume time, processing resources, and/or memory.

SUMMARY

In one aspect, a query statement is received that specifies a count distinct. Thereafter, a data flow graph that comprises a plurality of nodes for executing the query is generated. The nodes provide aggregation operations, sorting of results on join attributes and vertically appending columns of count distinct results with intermediate results from at least one of the aggregation operations. Thereafter, execution of the query is initiated using the data flow graph.

The query can be executed against an in-memory database such as an in-memory columnar database. In addition, columns of count distinct results can be vertically appended using a vertical union operation.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, methods can be implemented by one or more data processors either within a single computing system or distributed among two or more computing systems.

The subject matter described herein provides many advantages. For example, the current subject matter enables the calculation of count distinct of attributes that reduces query runtime as compared to conventional techniques while additionally consuming fewer processing resources. In particular, the current subject matter avoids complex joins which can consume significant resources.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
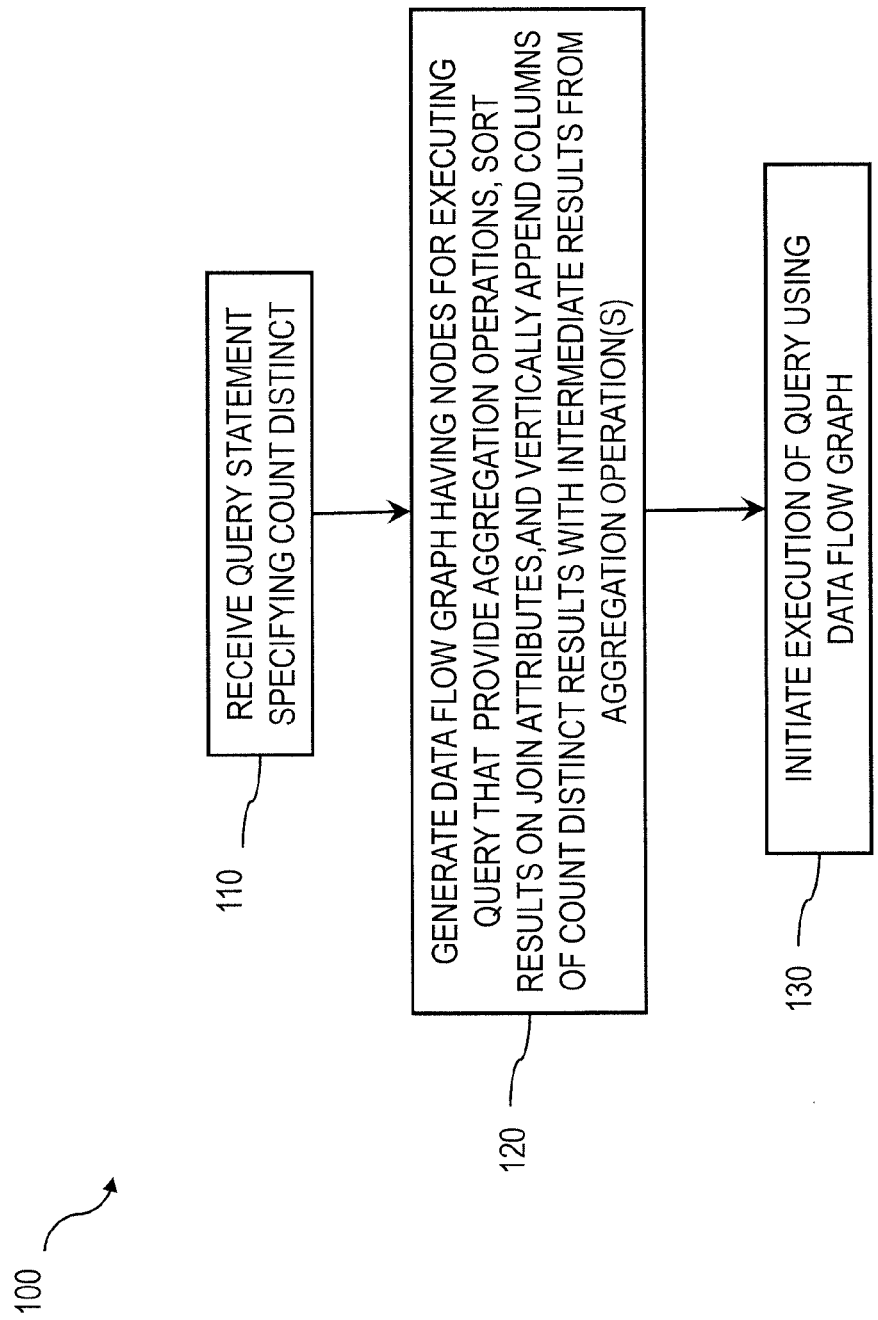
FIG. 1 is a process flow diagram illustrating a method of calculating count distinct with vertical unions.

FIG. 1 is a process flow diagram 100 illustrating a method in which, at 110, a query statement is received that specifies a count distinct. Thereafter, at 120, a data flow graph is generated that comprises a plurality of nodes for executing the query. The nodes are arranged so that they provide for aggregation operations, sorting of results on join attributes, and vertically appending columns of count distinct results with intermediate results from at least one of the aggregation operations. Execution of the query is, at 130, subsequently initiated using the data flow graph.

Figure 2:
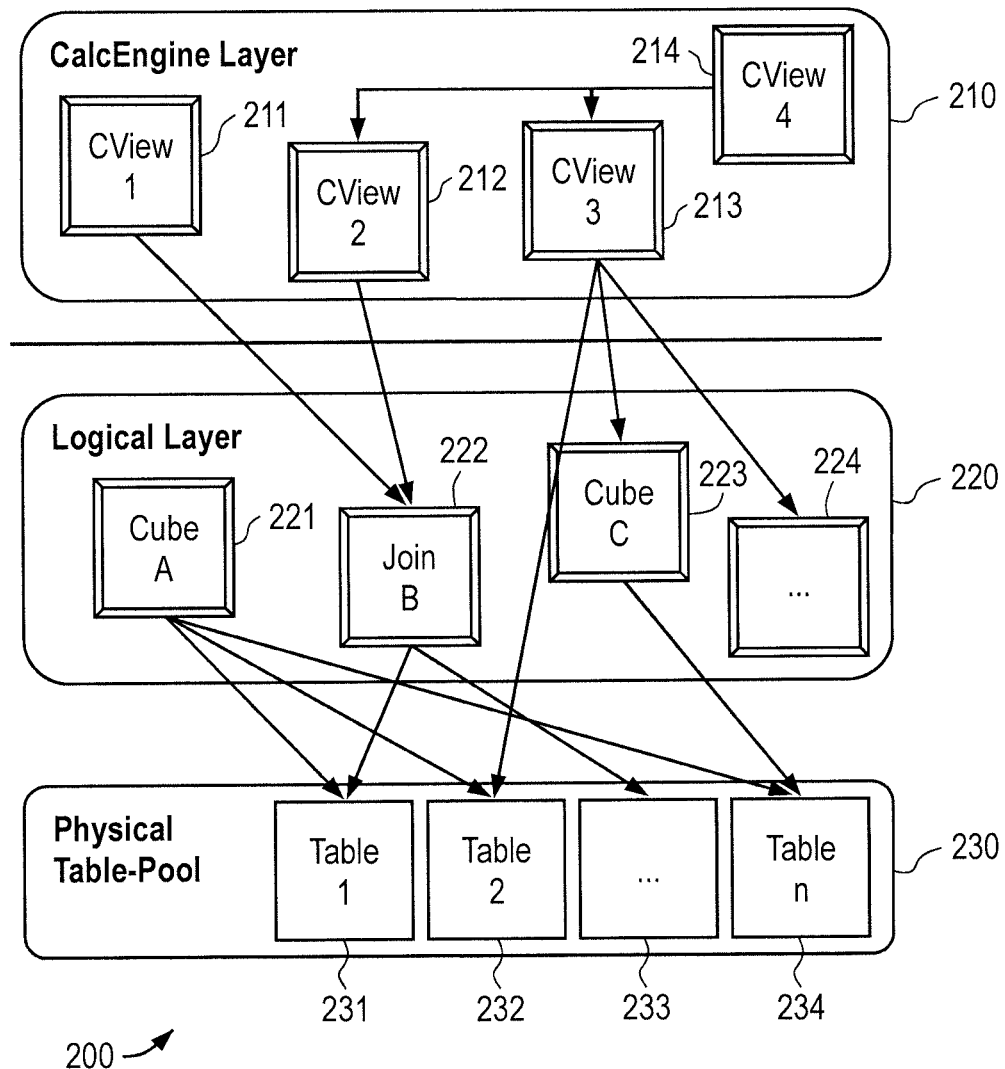
FIG. 2 is a diagram illustrating a calculation engine layer, a logical layer, a physical table pool and their interrelationship.

The current subject matter can be implemented, for example, in connection with a calculation engine environment such as that illustrated in the diagram 200 of FIG. 2. In FIG. 2, illustrated are a database system in which there are three layers, a calculation engine layer 210, a logical layer 220, and a physical table-pool 230. Calculation scenarios (e.g., data flow graphs, etc.) can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical metamodels defined by the logical layer 220 to form a new index. For example, the tables in a cube (OLAP index) can be assigned roles (e.g., fact or dimension tables) and joined to form a star schema. It is also possible to form join indexes, which can act like database view in environments such as the Fast Search Infrastructure (FSI) by SAP AG.

Calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP indexes or calculation nodes.

In calculation scenarios, two different representations can be provided. First, a pure calculation scenario in which all possible attributes are given. Second, an instantiated model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario. Example environments for implementing calculation scenarios can be found, for example, in U.S. patent application Ser. No. 12/914,445, the contents of which are hereby fully incorporated by reference.

Every calculation scenario can be uniquely identifiable by a name (i.e., the calculation scenario can be a database object with a unique identifier, etc.). This means, that the calculation scenario can be queried in a manner similar to a view in a SQL database. Thus, the query is forwarded to the calculation node 211-214 for the calculation scenario that is marked as the corresponding default node. In addition, a query can be executed on a particular calculation node 211-214 (as specified in the query). Furthermore, nested calculation scenarios can be generated in which one calculation scenario is used as source in another calculation scenario (via a calculation node 211-214 in this calculation scenario). Each calculation node 211-214 can have one or more output tables. One output table can be consumed by several calculation nodes 211-214.

Figure 3:
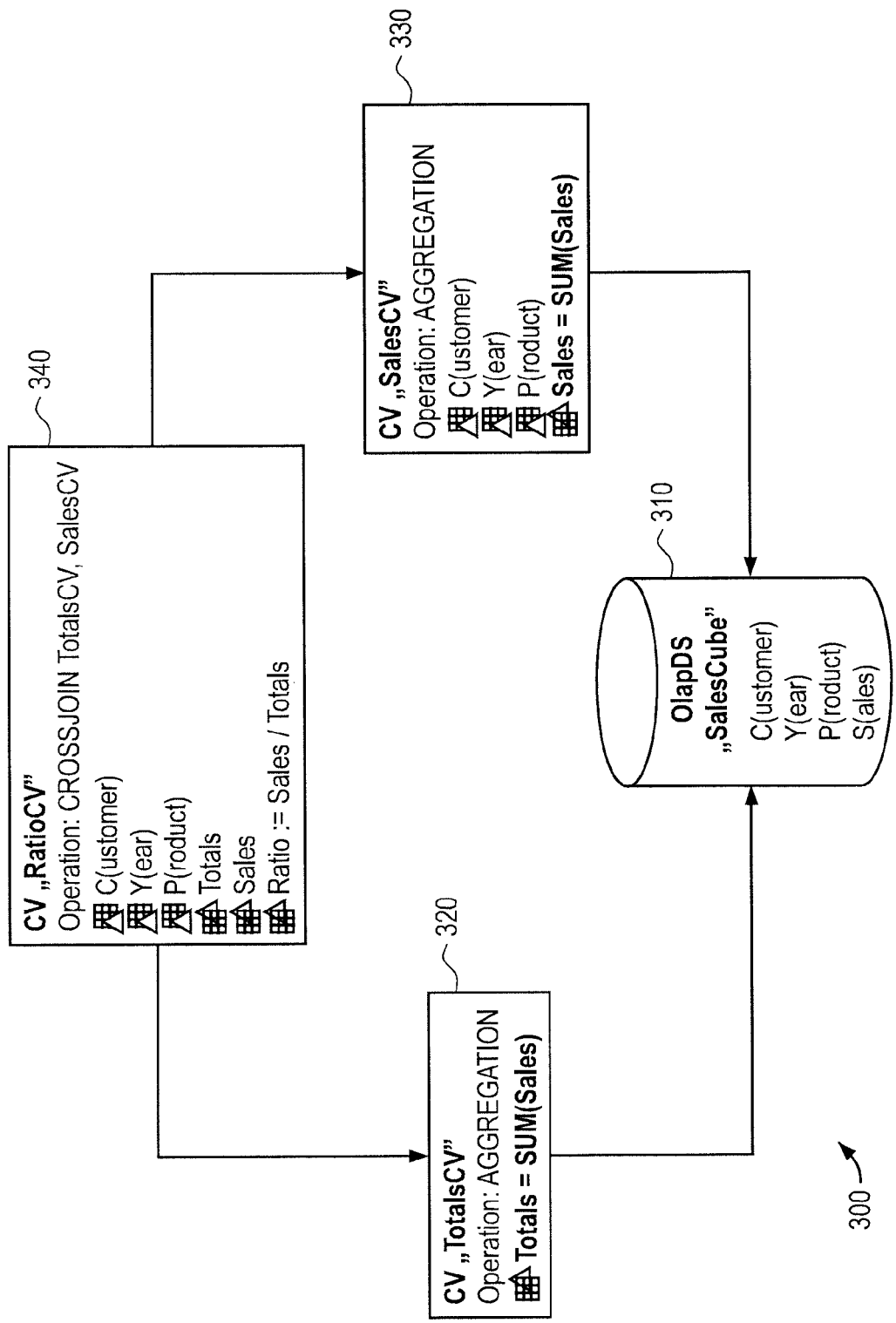
FIG. 3 is a diagram illustrating a first instantiation of a calculation scenario.

FIG. 3 is a diagram 300 illustrating an example of a calculation scenario that relates a number of sales to total sales. With conventional arrangements, such a query can be expressed with several SQL statements but not in a single statement, because for the calculation of the relation two aggregations at different aggregation levels are required. To calculate the number of sales, aggregation is performed by a requested GroupBy attribute. To calculate the sales total, all sales need to be aggregated. Previously this required two separate requests on different SQL view, and the final calculation had to be performed in the application (as opposed to database-side).

For this example, that data source is an OLAP cube "SalesCube" 330, which has the three dimensions Customer, Year, and Product as well as the measure Sales. As stated, this data source 310 can be entered as a special DataSource node in the logical layer 220 in the calculation scenario. The DataSource is now referenced from two calculation nodes. The calculation node TotalsCV 320 on the left side calculates the sales total, by simply summing the sales without any GroupBy attributes. The calculation node SalesCV 330 on the right side calculates the sales according to the GroupBys. To calculate their relationship, the two calculation nodes 320, 330 are joined with each other using a CrossJoin. In the calculation node RatioCV 340 after the join, all the attributes needed for the calculation are available and a new calculated attribute Ratio is provided.

Figure 4:
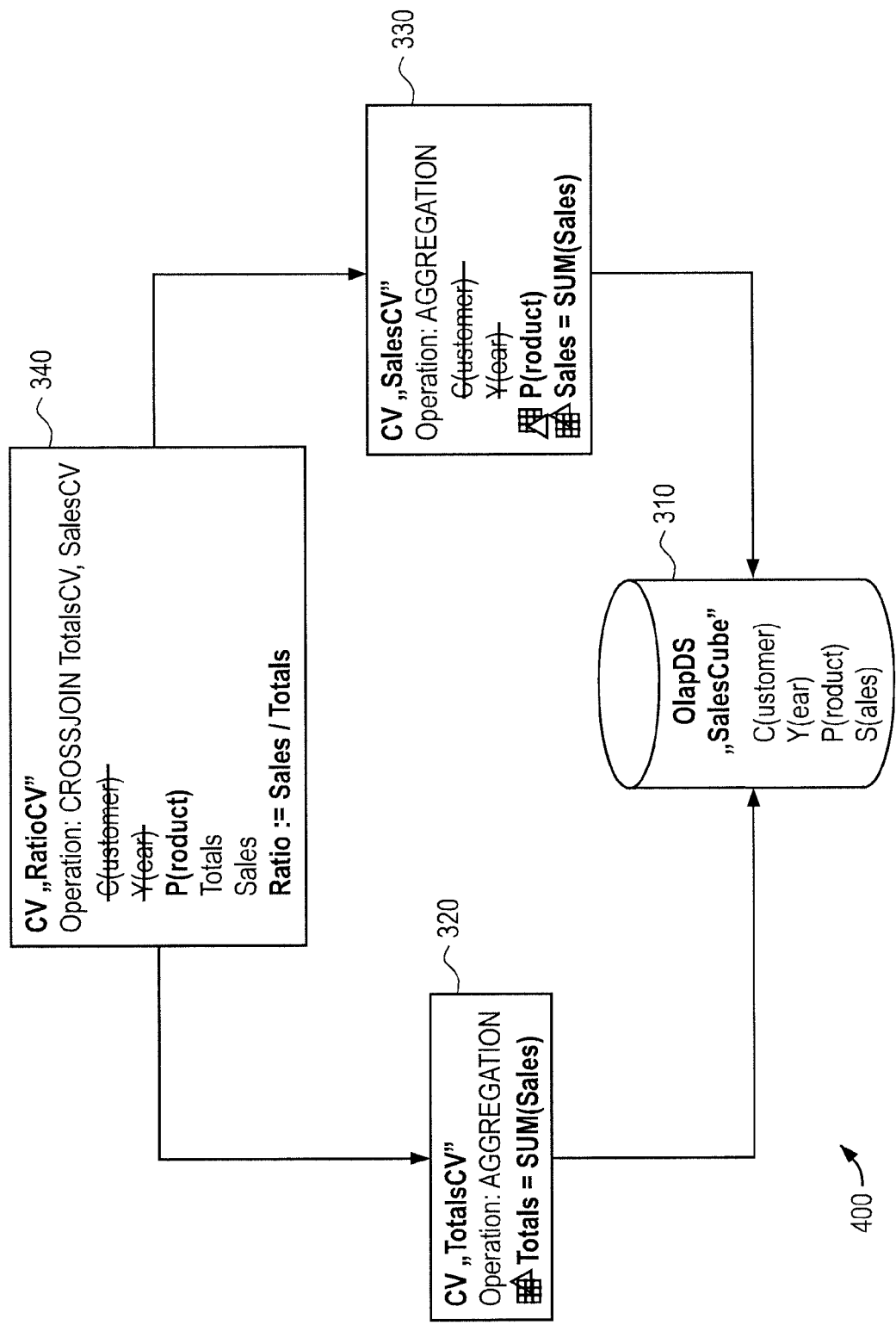
FIG. 4 is a diagram illustrating a second instantiation of a calculation scenario.

The implementation of FIG. 3 is a general calculation scenario. That is, if the calculation scenario is queried via a SQL statement which only requests product as GroupBy attribute, the model is appropriately instantiated and executed. FIG. 4 is a diagram 400 illustrating a variation in which not all of the attributes specified by the calculation nodes 330, 340 are required. In particular, the ratio calculation is for sales relative to total sales without regard to customer and year. In the instantiation, the unnecessary attributes Customer and Year are removed from the calculation nodes RatioCv 340 and SalesCV 330 which accelerates execution of the results (e.g., the ratio) because less data has to be touched (i.e., fewer attributes need to be searched/persisted, etc.).

Figure 5:
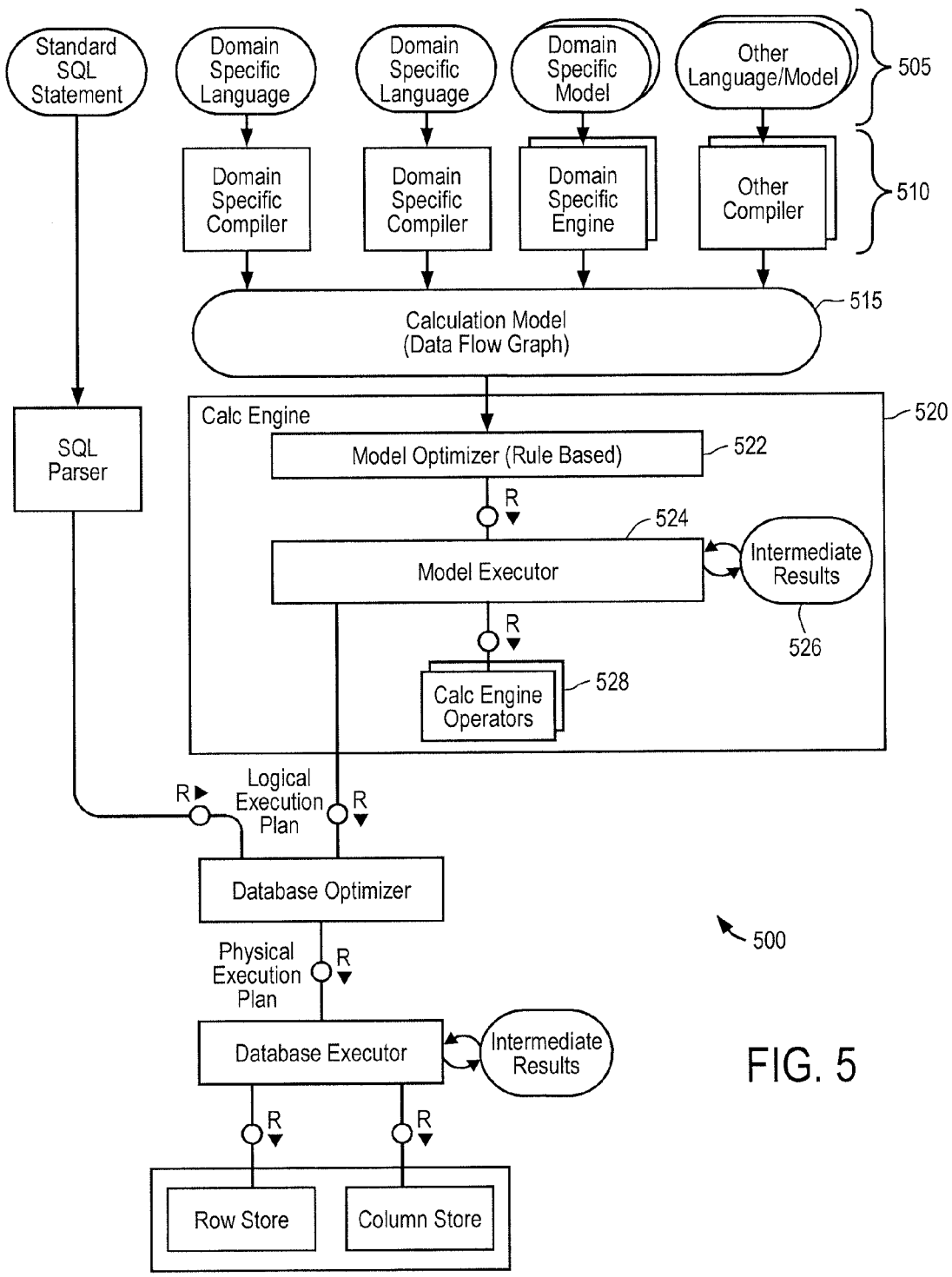
FIG. 5 is a diagram illustrating an architecture for processing and execution control.

FIG. 5 is a diagram 500 illustrating a sample architecture for request processing and execution control. As shown in FIG. 5, artifacts 505 in different domain specific languages can be translated by their specific compilers 510 into a common representation called a "calculation scenario" 515 (illustrated as a calculation model). To achieve enhanced performance, the models and programs written in these languages are executed inside the database server. This arrangement eliminates the need to transfer large amounts of data between the database server and the client application. Once the different artifacts 505 are compiled into this calculation scenario 515, they can be processed and executed in the same manner. The execution of the calculation scenarios 515 (i.e., data flow graphs) is the task of a calculation engine 520.

The calculation scenario 515 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 515 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 515 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data.

A calculation scenario 515 can be defined as part of database metadata and invoked multiple times. A calculation scenario 515 can be created, for example, by a SQL statement "ALTER SYSTEM ADD SCENARIO <xml OR json representing the scenario>". Once a calculation scenario 515 is created, it can be queried (e.g., "SELECT A, B, C FROM <scenario name>", etc.). In some cases, databases can have pre-defined calculation scenarios 515 (default, previously defined by users, etc.). The calculation scenarios 515 can be persisted in a repository (coupled to the database server) or in transient scenarios, the calculation scenarios 515 can be kept in-memory.

Calculation scenarios 515 are more powerful than traditional SQL queries or SQL views for many reasons. One reason is the possibility to define parameterized calculation schemas that are specialized when the actual query is issued. Unlike a SQL view, a calculation scenario 515 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 515 may contain an aggregation node containing all attributes. Later, the attributes for grouping can be supplied with the query. This allows having a predefined generic aggregation, with the actual aggregation dimensions supplied at invocation time. The calculation engine 520 can use the actual parameters, attribute list, grouping attributes, and the like supplied with the invocation to instantiate a query specific calculation scenario 515. This instantiated calculation scenario 515 is optimized for the actual query and does not contain attributes, nodes or data flows that are not needed for the specific invocation.

When the calculation engine 520 gets a request to execute a calculation scenario 515, it can first optimize the calculation scenario 515 using a rule based model optimizer 522. Examples for optimizations performed by the model optimizer can include "pushing down" filters and projections so that intermediate results 526 are narrowed down earlier, or the combination of multiple aggregation and join operations into one node. The optimized model can then be executed by a calculation engine model executor 524 (a similar or the same model executor can be used by the database directly in some cases). This includes decisions about parallel execution of operations in the calculation scenario 515. The model executor 524 can invoke the required operators (using, for example, a calculation engine operators module 528) and manage intermediate results. Most of the operators are executed directly in the calculation engine 520 (e.g., creating the union of several intermediate results). The remaining nodes of the calculation scenario 515 (not implemented in the calculation engine 520) can be transformed by the model executor 524 into a set of logical database execution plans. Multiple set operation nodes can be combined into one logical database execution plan if possible.

The calculation scenarios 515 of the calculation engine 520 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 520 to execute the calculation scenario 515 behind the calculation view. In some implementations, the calculation engine 520 and the SQL processor are calling each other: on one hand the calculation engine 520 invokes the SQL processor for executing set operations and SQL nodes and, on the other hand, the SQL processor invokes the calculation engine 520 when executing SQL queries with calculation views.

Figure 6:
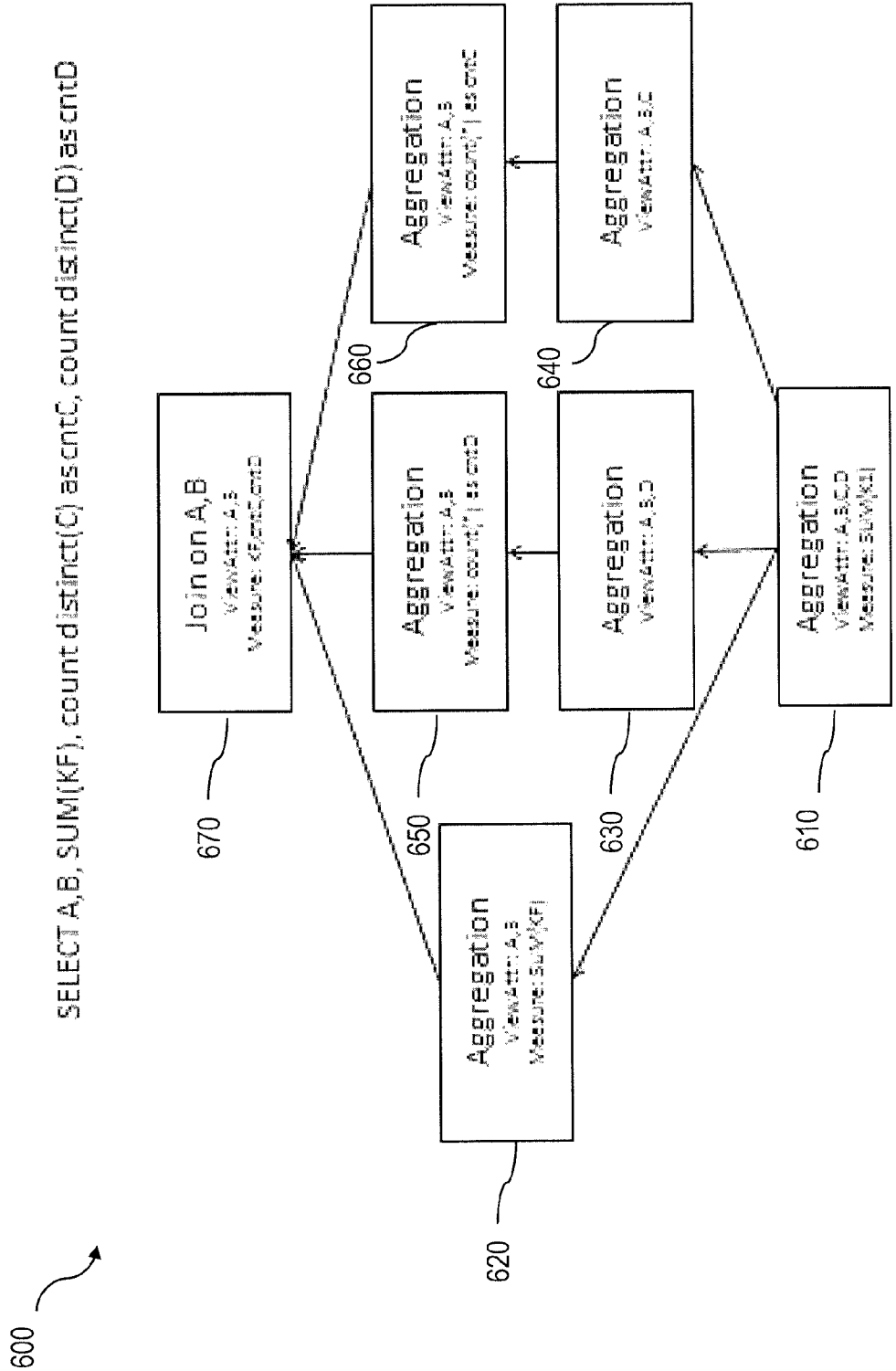
FIG. 6 is a diagram illustrating calculation of count distinct using a join operation.

FIG. 6 is a diagram 600 illustrating a technique for calculating a count distinct in a data flow graph (e.g., calculation scenario, etc.) in which aggregations are stacked. In this case, the SELECT statement can be defined as SELECT A, B,SUM (KF), countdistinct(C) as cntC, count distinct(D) as cntD. Referring to FIG. 6, at 610, an initial aggregation operation obtains views of A, B, C, D in order to result in SUM(K1). The resulting data set is then used for three separate aggregation operations 620, 630, 640. With the first such aggregation operation 620, the aggregation is across attributes A, B to result in SUM(KF) (e.g., a sum of a key figure to associate with the count distinct values). With the second such aggregation operation 630, the aggregation is across attributes A, B, and D so that a related aggregation operation 650 with view of A, B can calculate the special attribute D. With the third such aggregation operation 640, the aggregation is across attributes A, B, C so that a related aggregation operation 640 with a view of A, B can calculate the special attribute C. The result of each of the aggregations 620, 650, 660 are then combined via a join operation 670 to result in a measure of the key figure KF and the calculated count distinct for attributes C and D. The join operation 670 can, in some cases, be complex and expend significant resources.

Figure 7:
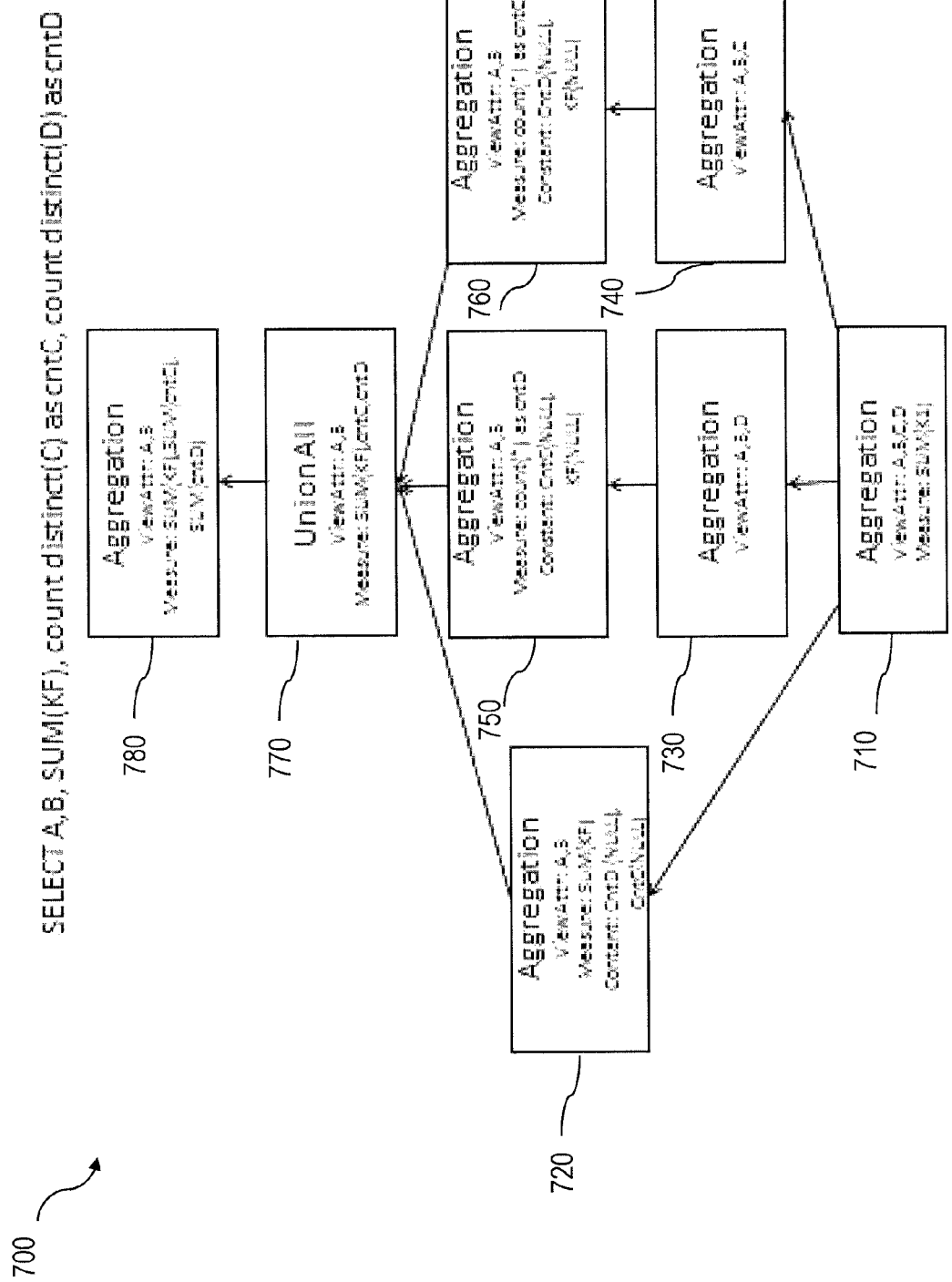
FIG. 7 is a diagram illustrating calculation of count distinct using a union operation.

FIG. 7 is a diagram 700 illustrating another technique for calculating a count distinct in a data flow graph in which different results are unioned and an aggregation is subsequently performed. Also with this case, the SELECT statement can be defined as SELECT A, B, SUM(KF), countdistinct(C) as cntC, count distinct(D) as cntD. An initial aggregation operations 710 obtains views of attributes A, B, C, D and generates SUM (K1). This initial aggregation operation 710 is followed by three subsequent aggregation operations 720, 730, 740. The first such aggregation operation 720 is across attributes A, B to result in SUM(KF). In addition, a calculated count distinct for attributes D and C is null (as such attributes are not part of the view). With the second such aggregation operation 730 and a subsequent aggregation operation 750 a view of attributes A, B, D is used to calculate a count distinct for D (while the count distinct for C is null as well as SUM(KF). With the third such aggregation operation 740 and a subsequent aggregation operation 760 a view of attributes A, B, C is used to calculate a count distinct for C (while the count distinct for D is null as well as SUM(KF). A union operation 770 combines the result of aggregation operations 720, 750, 760 so that a final aggregation operation 780 can provide the SUM(KF), and the count distinct values for cntC and cntD. The union operation 770 can, in some cases, be space and time consuming thereby reducing overall performance.

Figure 8:
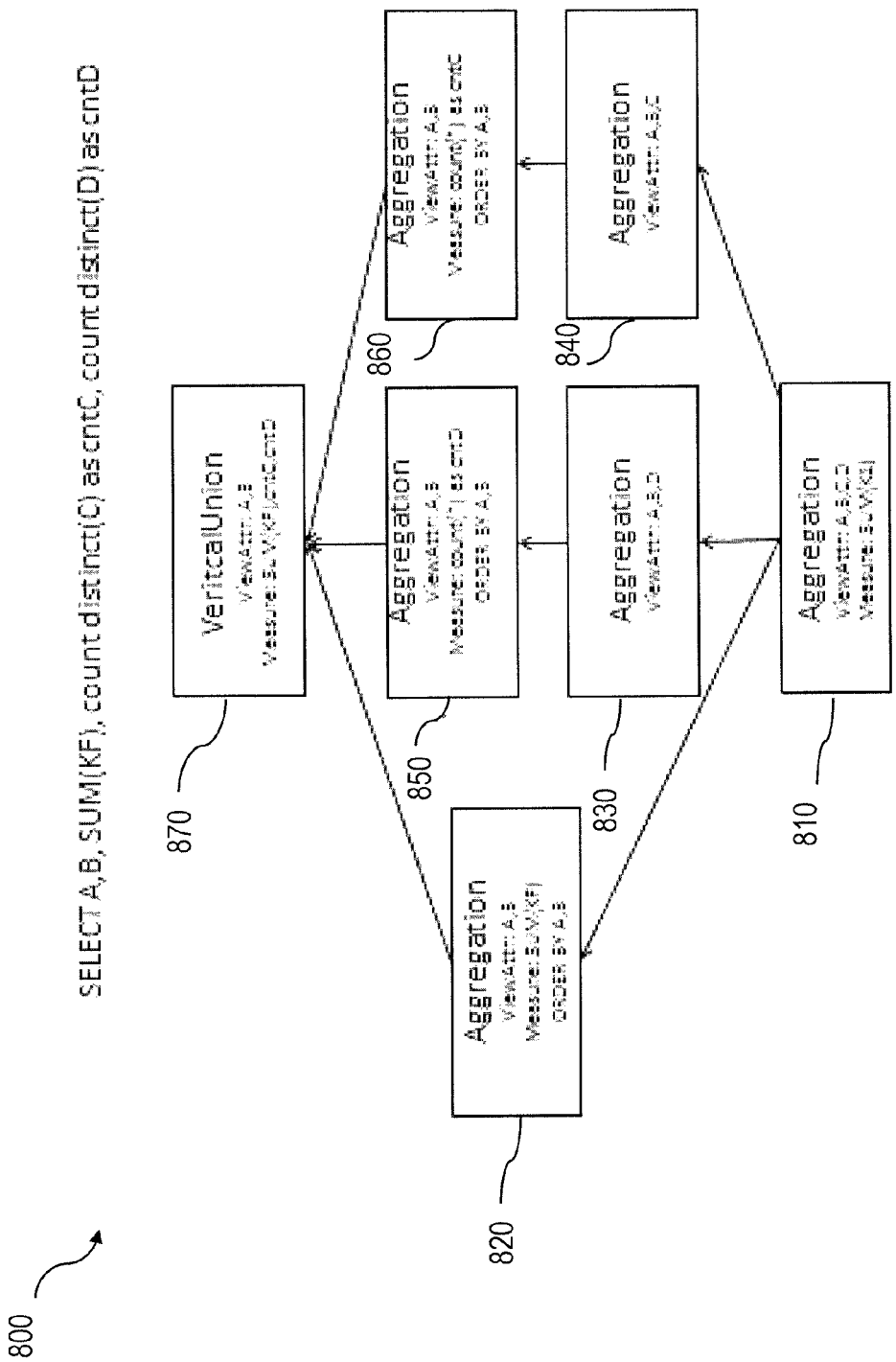
FIG. 8 is a diagram illustrating calculation of count distinct using a vertical union operation.

FIG. 8 is a diagram 800 illustrating an arrangement that utilizes less processing resources (e.g., CPU, etc.) as well as time as compared to the arrangements of FIGS. 6 and 7. Also with this case, the SELECT statement can be defined as SELECT A, B,SUM(KF), countdistinct(C) as cntC, count distinct(D) as cntD. Referring to FIG. 8, at 810, an initial aggregation operation uses views of A, B, C, D in order to result in SUM(K1). The resulting data set is then used for three separate aggregation operations 820, 830, 840. With the first such aggregation operation 820, the aggregation is across attributes A, B to result in SUM(KF) (e.g., a sum of a key figure to associate with the count distinct values) which is ordered for each attribute A, B (i.e., they are sorted in different columns in a table, etc.). With the second such aggregation operation 830, the aggregation is across attributes A, B, and D so that a related aggregation operation 850 with view of A, B can calculate the special attribute D which is ordered for each attribute A, B. With the third such aggregation operation 840, the aggregation is across attributes A, B, C so that a related aggregation operation 840 with a view of A, B can calculate the special attribute C which is ordered for each attribute A, B (i.e., they are sorted in different columns in a table, etc.). The result of each of the aggregations 820, 850, 860 are then combined via a vertical union operation 870 to result in a measure of KF and the calculated count distinct for attributes C and D. Stated differently, FIG. 8 illustrates an arrangement which sorts results on join attributes and vertically appends columns of the count distinct results to one of the other intermediate results (e.g., a leading intermediate result) instead of unioning or joining the different aggregation results together.

Figure 9:
FIG. 9 is a diagram illustrating tables being vertically unioned.

Diagram 900 of FIG. 9 shows an example vertical union operation. As illustrated, Table A includes columns 1, 2, and Table B includes columns 3, 4. The vertical union operation acts to combine these tables into Table AB that includes columns 1, 2, 3, 4. Such a vertical union operation can be executed quickly due to the use of a column oriented memory structure (e.g., a columnar database, etc.). As a result only some pointers need to be changed reflecting this new table structure.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figure(s) and described herein do not require the particular order shown, or sequential order, to achieve desirable results. Other embodiments may be within the scope of the following claims.

What is claimed is:

1. A method comprising:
    receiving a query statement specifying a count distinct;
    generating a data flow graph comprising a plurality of nodes for executing the query, the nodes providing for a plurality of aggregation operations generating join attributes for the plurality of aggregation operations,
    sorting each result of the plurality of aggregation operations on the join attributes, and
    calculating a count distinct of a plurality of intermediate result from the plurality of aggregation operations based on key figures of the aggregation operations, by vertically appending columns of count distinct results with intermediate results from at least one of the aggregation operations;
    wherein the vertically appending operation takes a first input table comprising a plurality of columns including a count distinct result and a second input table comprising a plurality of columns from the intermediate results from the at least one of the aggregation operations, wherein the first and second input table have no common columns, and generates a result table comprising all of the columns from the first table and second table;
    calculating two or more count distinct key figures-in parallel; and
    wherein each of the one or more aggregation operations provides a view across two or more attributes with each attribute being sorted in a separate column; and
    initiating executing of the query using the data flow graph.

2. A method as in claim 1, wherein the query is executed against an in-memory database.

3. A method as in claim 1, wherein the in-memory database is a columnar database.

4. A method as in claim 1, wherein columns of count distinct results are vertically appended using a vertical union operation.

5. A method as in claim 1, wherein one or more of the receiving, generating, and initiating is performed by at least one data processor of at least one computing system.

6. A non-transitory computer program product storing instructions that, when executed by at least one programmable processor, cause the at least one programmable processor to perform operations comprising:
    receiving a query statement specifying a count distinct;
    generating a data flow graph comprising a plurality of nodes for executing the query, the nodes providing for a plurality of aggregation operations generating join attributes for the plurality of aggregation operations,
    sorting each result of the plurality of aggregation operations on the join attributes, and
    calculating a count distinct of a plurality of intermediate result from the plurality of aggregation operations based on key figures of the aggregation operations, by vertically appending columns of count distinct results with intermediate results from at least one of the aggregation operations;
    wherein the vertically appending operation takes a first input table comprising a plurality of columns including a count distinct result and a second input table comprising a plurality of columns from the intermediate results from the at least one of the aggregation operations, wherein the first and second input table have no common columns, and generates a result table comprising all of the columns from the first table and second table;
    calculating two or more count distinct key figures-in parallel; and
    wherein each of the one or more aggregation operations provides a view across two or more attributes with each attribute being sorted in a separate column; and
    initiating executing of the query using the data flow graph.

7. A computer program product as in claim 6, wherein the query is executed against an in-memory database.

8. A computer program product as in claim 6, wherein the in-memory database is a columnar database.

9. A computer program product as in claim 6, wherein columns of count distinct results are vertically appended using a vertical union operation.

10. A system comprising:
    one or more data processors;
    memory storing instructions, which when executed by at least one data processor, result in operations comprising:
        receiving a query statement specifying a count distinct;
        generating a data flow graph comprising a plurality of nodes for executing the query, the nodes providing for a plurality of aggregation operations generating join attributes for the plurality of aggregation operations,
        sorting each result of the plurality of aggregation operations on the join attributes, and
        calculating a count distinct of a plurality of intermediate result from the plurality of aggregation operations based on key figures of the aggregation operations, by vertically appending columns of count distinct results with intermediate results from at least one of the aggregation operations;

wherein the vertically appending operation takes a first input table comprising a plurality of columns including a count distinct result and a second input table comprising a plurality of columns from the intermediate results from the at least one of the aggregation operations, wherein the first and second input table have no common columns, and generates a result table comprising all of the columns from the first table and second table;

calculating two or more count distinct key figures in parallel; and wherein each of the one or more aggregation operations provides a view across two or more attributes with each attribute being sorted in a separate column; and initiating executing of the query using the data flow graph.

11. A system as in claim 10, wherein the query is executed against an in-memory database.

12. A system as in claim 10, wherein the in-memory database is a columnar database.

13. A system as in claim 10, wherein columns of count distinct results are vertically appended using a vertical union operation.

\* \* \* \* \*